G. Hawkes,

Lasting Machine.

No 2,807. Reissued Nov. 26, 1867.

Witnesses

Chas. F. Sleeper.

H W Howard

Inventor

Gilbert Hawkes by Jos. H. Adams

Atty.

N. PETERS, PHOTO-LITHOGRAPHER, WASHINGTON, D. C.

United States Patent Office.

GILBERT HAWKES, OF LYNN, MASSACHUSETTS.

*Letters Patent No.* 55,858, *dated June* 26, 1866; *reissue No.* 2,807, *dated November* 26, 1867.

MANUFACTURE OF BOOTS AND SHOES.

The Schedule referred to in these Letters Patent and making part of the same.

TO ALL WHOM IT MAY CONCERN:

Be it known that I, GILBERT HAWKES, of Lynn, in the county of Essex, and State of Massachusetts, have invented a new and useful Improvement in the Method of Lasting Boots and Shoes, of which the following is a full, clear, and exact description, reference being had to the accompanying drawings, making a part of this specification, in which—

Figure 1:
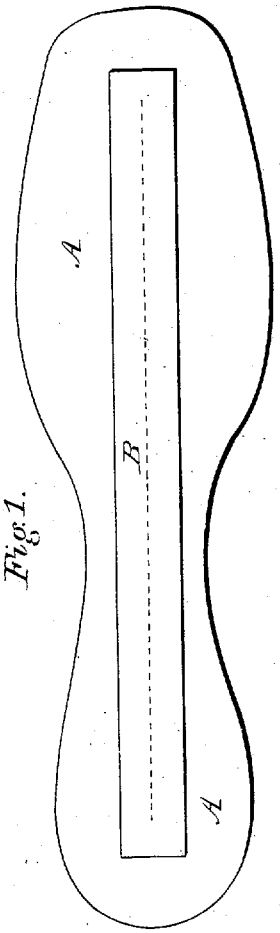

Figure 1 represents an inner sole with a narrow strip of cloth or other material attached to it.

Figure 2:
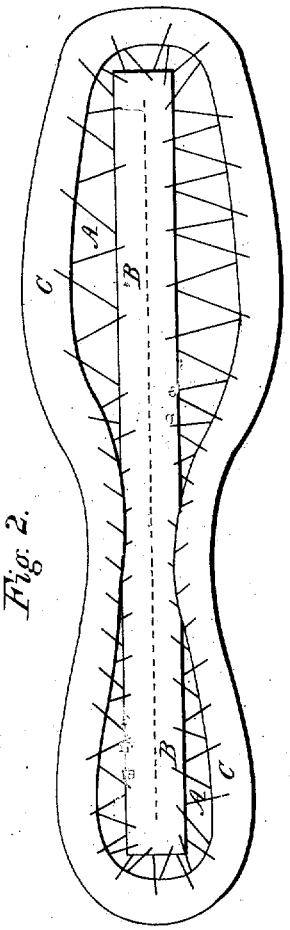

Figure 2 indicates a method of attaching the upper to the inner sole.

Figure 3:
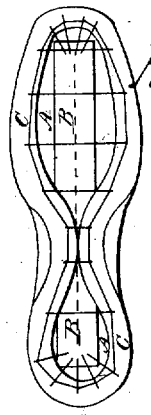

Figure 3 exhibits a different mode of stitching from that shown in fig. 2; and

Figure 4 is a view of the inner sole without the strip.

This invention is designed to be applied more particularly to the lasting of boots and shoes which are sewed by machinery, and the object of the invention is to provide a means of attaching the upper to the inner sole, wherby the finished sole of the boot or shoe will be rendered more flexible and pliant than those made by machinery, with the mode of lasting hitherto practised, and so obtain the advantages of a hand-made shoe; and likewise in providing an inner sole, the use of which, in connection with the mode of lasting devised, will more fully accomplish these results, and also diminish the labor and expense in preparing the inner sole for the market. And the invention consists of an inner sole, made of a textile material, which may be stiffened by the application of varnish or substance suitable to the purpose. It also consists in the employment of a strip of cloth or other material, attached in any suitable manner to the centre of the under side of the inner sole, to which strip the upper is attached by stitching, or in the employment of such an equivalent as will furnish a means of attaching the upper to the inner sole by stitching.

In the manufacture of machine-sewed boots and shoes, the practice has been hitherto to prepare or "last" the shoe by fastening the upper to the inner sole with numerous small nails, which method of preparation is universally considered very objectionable, for many reasons. Prior to my invention no means have been devised, to my knowledge, to overcome these objections, except partially by the expensive and tedious process of "whipping" the upper to the inner sole at a line following the outline of the inner sole, and near its edge. This "whipping" process is effected by means of a curved awl and thread, with a bristle secured to the end to facilitate the work. By my process the upper is secured to the centre of the inner sole by means of stitches extending partially across the inner sole to a strip of cloth, waste leather, or other suitable material, attached to the centre of the inner sole by a row of stitches passing through the strip and inner sole, and so securing the strip thereto as to make it capable of bearing the strain to which it is subjected in lasting the boot or shoe.

Owing to the stiffness and want of pliability in boots and shoes made by machinery, under the ordinary plan of lasting, the stitch that connects the outer to the inner sole frequently becomes broken. The small nails are also liable to work up through the inner sole, and thus render it uncomfortable to the wearer.

The inner sole has heretofore been made of leather, or of what is termed "leather paper," and I am not aware that a textile material has ever been used for the purpose of an inner sole.

Referring to the drawings, A represents an inner sole, made of a textile material, to which, should it not be sufficiently rigid, I propose applying a coating of varnish or other suitable substance; or a layer of paper, leather paper, &c., may be applied for the purpose of stiffening it and rendering it more efficient, if necessary; and the said substance may be water-proof if desirable. Extending along the centre of the under side of the inner sole is a strip, B, of cloth, or any other suitable material, from the rear end, or nearly so, to a point near the front end or toe of the same. The strip B may be stitched or attached to the inner sole in any suitable manner. It is shown in the drawings as attached by a single row of stitches, extending longitudinally through the centre of the said strip and inner sole. Fig. 3 represents a method of lasting by carrying the stitches across at right angles to the central line of stitches, and taking in opposite points on the edges of the uppers, the cross-stitch being caught in the centre to the strip or central line of stitches, for greater security. C represents the upper, which is drawn over the edges of the last, and stitched to the strip B, as shown in fig. 2, or as in fig. 3. The upper may, however, be stitched or secured to the inner sole when made of textile material, directly, without the intervention of the strip B; and without departing from the spirit of my invention, the said strip may be dispensed with, and the upper attached directly to the central line of stitches, which would be the equivalent of the method of attaching by the strip. I have found, however, in practice, that the use of the central strip is preferable, inasmuch as it is attached with greater facility, is much more economical, as the single stitch would require a stronger and more expensive quality of thread, and effects a better attachment of the uppers by equalizing the strain upon and around the edges of the latter.

Having thus described my invention, what I claim, and desire to secure by Letters Patent, is—

1. An inner sole, made of a textile material, to be used either with or without a stiffening-substance, as set forth.

2. I claim a strip, B, of a textile or other suitable material, or its equivalent, when used as and for the purpose described.

3. I claim the combination of an inner sole, A, formed of a textile material, with a strip, B, of any suitable material, as and for the purpose specified.

4. I claim the application, to the lasting of boots and shoes, of an inner sole, of textile material, as described.

5. The mode, substantially as set forth, of securing the uppers to the inner sole, in lasting boots or shoes, by stitching the former, not directly to the latter, but to a suitable supplementary material attached thereto.

In testimony whereof I have signed my name to this specification in the presence of two subscribing witnesses.

GILBERT HAWKES.

Witnesses:

J. H. ADAMS,

M. S. G. WILDE.